United States Patent [19]

Tanaka

[11] 4,430,112

[45] Feb. 7, 1984

[54] SHEET GLASS PRODUCING APPARATUS

[75] Inventor: Kazuyuki Tanaka, Matsusaka, Japan

[73] Assignee: Central Glass Company, Limited, Ube, Japan

[21] Appl. No.: 396,326

[22] Filed: Jul. 8, 1982

Related U.S. Application Data

[63] Continuation of Ser. No. 318,692, Nov. 6, 1981, abandoned, which is a continuation of Ser. No. 142,151, Apr. 21, 1980, abandoned.

[30] Foreign Application Priority Data

May 1, 1979 [JP] Japan .................................. 54-53628

[51] Int. Cl.³ ........................ C03B 3/00; C03B 5/22
[52] U.S. Cl. ........................................ 65/335; 65/27; 65/134
[58] Field of Search ................... 65/27, 134, 135, 136, 65/335

[56] References Cited

U.S. PATENT DOCUMENTS 3,495,966 2/1970 West ..................................... 65/335
3,780,889 12/1979 Frazier et al. .................... 65/335 X Primary Examiner—Arthur D. Kellogg

[57] ABSTRACT

A powdered raw material feeding device is mounted beside a glass melting tank for feeding the powdered raw materials of glass onto a surface of molten glass in the tank. The raw materials thus riding on the molten glass are forced to move in the downstream direction in response to the feeding of the raw materials to the tank. An obstruction device is stationarily mounted in the way of a heap of the raw materials on the molten glass so that an extreme end of the obstruction device is embedded in the heap of the raw materials on the molten glass at a position near the laterally central position of the path of the heap, whereby upon movement of the heap in the downstream direction, a certain magnitude of flow resistance is applied to the heap of the raw materials.

6 Claims, 11 Drawing Figures

SHEET GLASS PRODUCING APPARATUS

This is a continuation of application Ser. No. 318,692, filed Nov. 6, 1981, which in turn is a continuation application of Ser. No. 142,151 filed Apr. 21, 1980, both now abandoned.

FIELD OF THE INVENTION

The present invention relates in general to a sheet glass production apparatus, and more particularly to an apparatus for feeding raw materials of glass to a glass melting furnace or tank.

BACKGROUND OF THE INVENTION

In continuous production of sheet glass, it is usual to use as a raw material feeding device a so-called blanket feeder which is mounted beside the glass melting tank. Powdered raw materials such as silica sand, soda ash, limestone, and cullet are mixed and then fed into the glass melting tank by the blanket feeder. During the downstream movement of the raw materials in the tank, the materials melt gradually by heat provided by the heated molten glass and two rows of burners arranged on both sides of the way along which the raw materials on the molten glass move. The molten glass which comes out from an outlet port of the tank is introduced into a suitable forming device to form rigid sheet glass. However, in this conventional method, there is a drawback which will become clear as the description proceeds.

OBJECTS OF THE INVENTION

It is an object of the present invention to provide an improved sheet glass production apparatus which is free of the drawbacks encountered in the prior art system.

It is another object of the present invention to provide an improved sheet glass production apparatus in which the raw materials of glass fed into a glass melting tank are assuredly prevented from contacting the side walls of the glass melting tank.

Other objects and advantages of the present invention will become clear from the following description when taken in conjunction with the accompanying drawings which are outlined hereinafter.

SUMMARY OF THE INVENTION

According to the present invention, there is provided an apparatus for producing a sheet glass. The apparatus comprises a glass melting tank in which molten glass is contained, the tank having heating means such that the tank has the highest temperature zone along the longitudinal axis of the tank; material feeding means for throwing powdered raw materials of glass onto a surface of the molten glass to form a heap of the raw materials on the molten glass so that the heap of the raw materials thus riding on the molten glass is forced to move along the longitudinal axis of the tank in the downstream direction in response to the feeding of the raw materials to the tank; and an obstruction device stationarily mounted in the path of the heap on the molten glass, the obstruction device having an extreme end which is embedded in the heap of the raw materials on the molten glass at a position near the laterally central portion of the path of the heap, whereby upon movement of the heap in the downstream direction, a certain magnitude of flow resistance is applied to the heap of the raw materials.

DESCRIPTION OF PRIOR ART APPARATUS

Prior to describing in detail the present invention, an explanation of prior art apparatus for feeding the raw materials of glass to a glass melting tank will be made with reference to FIG. 1 in order to clarify the invention.

Figure 1:
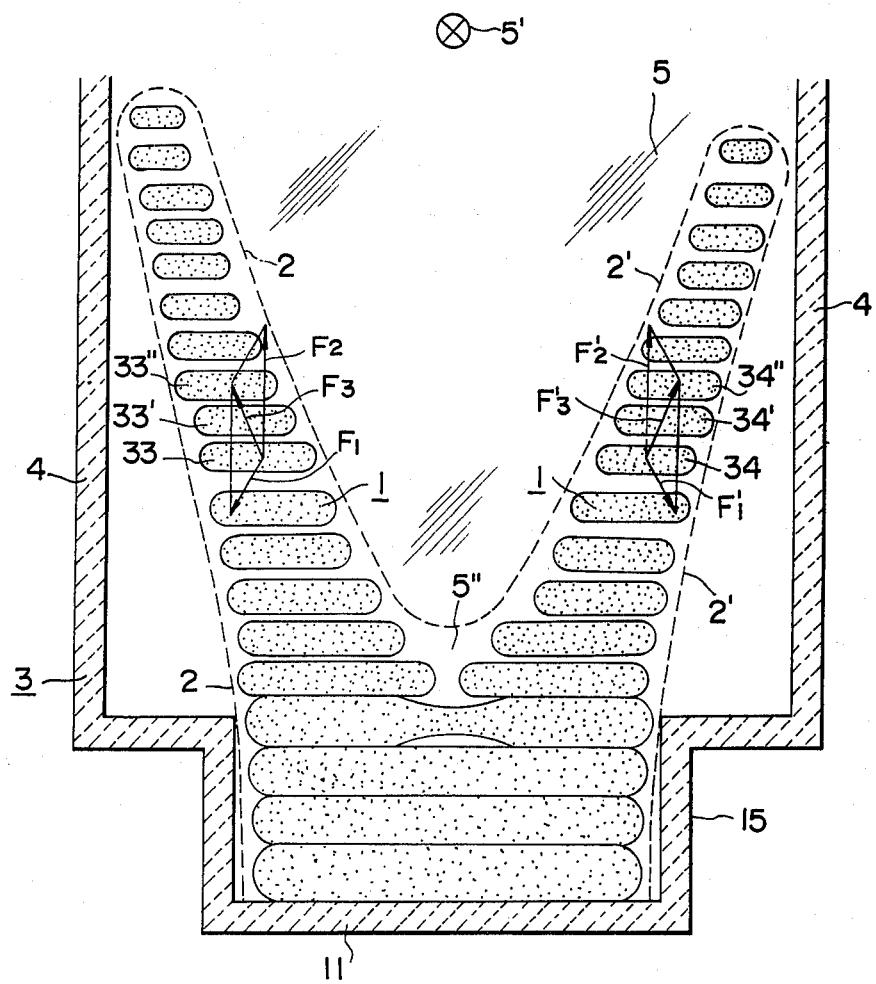
FIG. 1 is a schematically illustrated plan view of a conventional glass melting furnace or tank, showing the manner of flow of the raw materials floating on the molten glass in the tank.

Referring to FIG. 1 of the drawings, there is illustrated a plan view of a conventional glass melting furnace or tank 3, showing the characteristic manner of flow of the raw materials on the molten glass 5 in the tank 3. This manner of the flow is caused by the temperature distribution in the tank 3 as will be clear from the following. In the usual glass melting tank, the temperature at the laterally central portion of it is higher than that in the vicinity of side walls 4, so that the raw materials located at the central portion are most speedily melted, resulting in that the heap of the raw materials which is positioned apart from the central portion is divided into two sections flowing in downstream direction. The divided two sections are then moved away from each other, approaching the corresponding side walls 4. It sometimes happens however that the sideways moving raw materials reach and finally contact the walls 4, which causes a problem in the production of the sheet glass as will be described hereinnext.

As is known in the art, the raw materials of glass have a strong corrosive property, so that the contact of the raw materials with the walls 4 causes corrosion of the material of the walls 4 thereby shortening the life of the tank 3. Further, because of the corrosion thereof, the material of the walls 4, which may be constructed of heat resisting materials, is partly broken and some of the broken pieces of the walls 4 drop or fall into the molten glass 5 thereby unfavorably affecting the quality of property of the glass product.

Since the temperature in the vicinity of the wall 4 is relatively low as has been mentioned before, the separated heaps of the raw materials fail to be well melted. Thus, in order to solve this problem, it is necessary to use much more heat energy at the sacrifice of economical production.

The following description is intended to make clear the reason why the raw materials move toward the walls 4. Such movement of the raw materials is mainly caused by a convection of the molten glass 5.

Usually, the molten glass 5 in the tank 3 is heated by burners (not shown) such that the laterally central portion 5′ of the surface of the molten glass 5 shows the highest temperature. Thus, on the surface of the molten glass 5, there occur radially outwardly moving flows of the molten glass 5 from the section 5′ (which section is called as a hot spring). The hot spring appears at a section downstream of the section 5″ where the heap of the raw materials begins to be divided. Accordingly, as is indicated by arrows $F_1$ and $F'_1$, each of the cohesive masses of the raw materials such as 33, 33′, 33″, 34, 34′ or 34″ has a vector which urges the corresponding mass to move backward and sidewards.

On the other hand, in addition to the force given by the convection mentioned hereinabove, the molten glass 5 in the tank 3 is supplied with a propulsion force in response to throwing the raw materials of the glass into the tank, the throwing of the raw materials into the tank 3 being simultaneously made in accordance with a speed at which the molten glass 5 is drawn from the outlet port of the tank 3. Due to the propulsion force, each of the cohesive masses 33, 33′, 33″, 34, 34′ and 34″ of the raw materials is subjected to a vector of $F_2$ (or $F'_2$) which urges the corresponding mass in the downstream direction.

Thus, the separated two heaps 2 and 2′ of the raw materials are forced to move in a direction due to a force which is determined by a combined vector $F_3$ which is produced by combining the vectors $F_1$ and $F_2$. Since the vector $F_3$ has a direction toward the walls 4 of the tank 3 with respect to the major flowing direction of the molten glass 5, the separated heaps 2 and 2′ of the raw materials 1 move toward the side walls 4 during movement thereof in the downstream direction.

It has been revealed that at the bounding zone defined between the molten glass 5 and the raw materials 1 riding on the molten glass 5, there occurs a condition wherein the raw materials and the molten glass 5 are mixedly remained, so that the group of the masses 33, 33′ and 33″ and the group of the masses 34, 34′ and 34″ constitute the respective heaps 2 and 2′ of the raw materials, by using the molten glass 5 as a carrying medium. Further the raw material pushing force or pressure which is produced by the blanket feeder is transmitted to the downstream located masses 33, 33′ and 33″ and 34, 34′ and 34″ of the raw materials 1, by using the molten glass 5 as a carrying medium. Thus, it is considered that an urging force is applied to each of the heaps 2 and 2′ for moving each of the heaps sideways in their entirety.

Therefore, according to the present invention, there is provided an improved glass production apparatus in which the raw materials of glass fed into the glass melting tank never move toward the side walls of the glass melting tank irrespective of the occurrence of melting of the raw materials at the laterally central portion of the tank.

DESCRIPTION OF THE EMBODIMENTS

Figure 2:
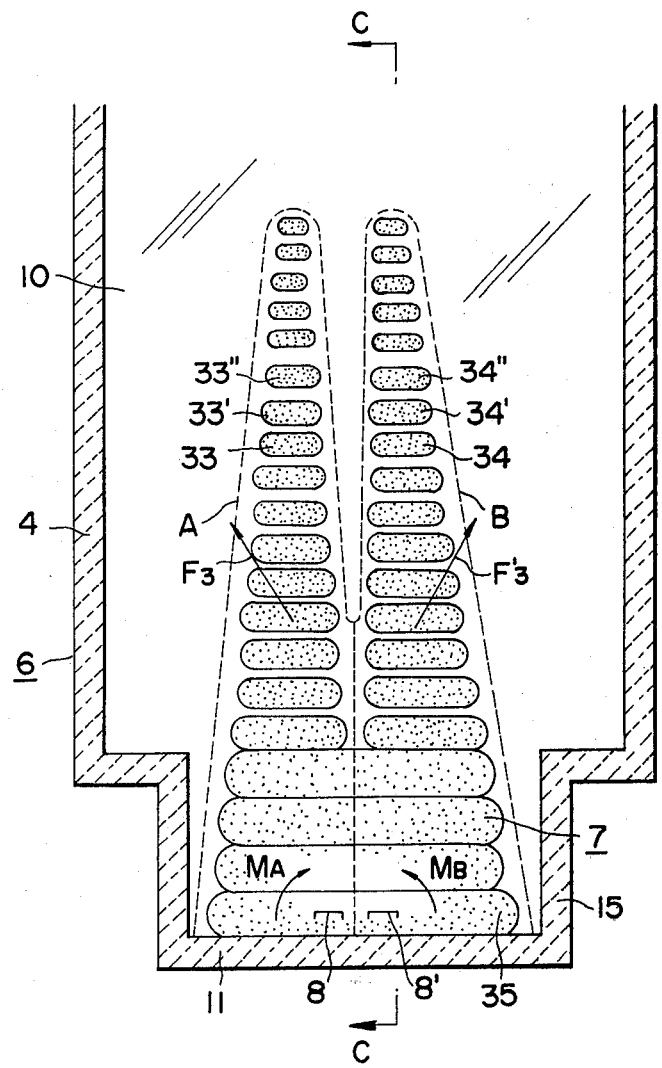
FIG. 2 is a view similar to FIG. 1, but shows the manner of flow of the raw materials which is achieved by a first embodiment of the present invention.

Referring to FIG. 2 of the drawings, there is shown a schematically illustrated plan view of a glass melting tank 6, showing a condition wherein the glass raw materials 7 thrown onto the molten glass flow in the downstream direction. The raw materials 7 are fed to an extension or dog house section 15 of the tank 6 by means of a blanket feeder 9 shown in FIG. 3.

Figures 3, 4:
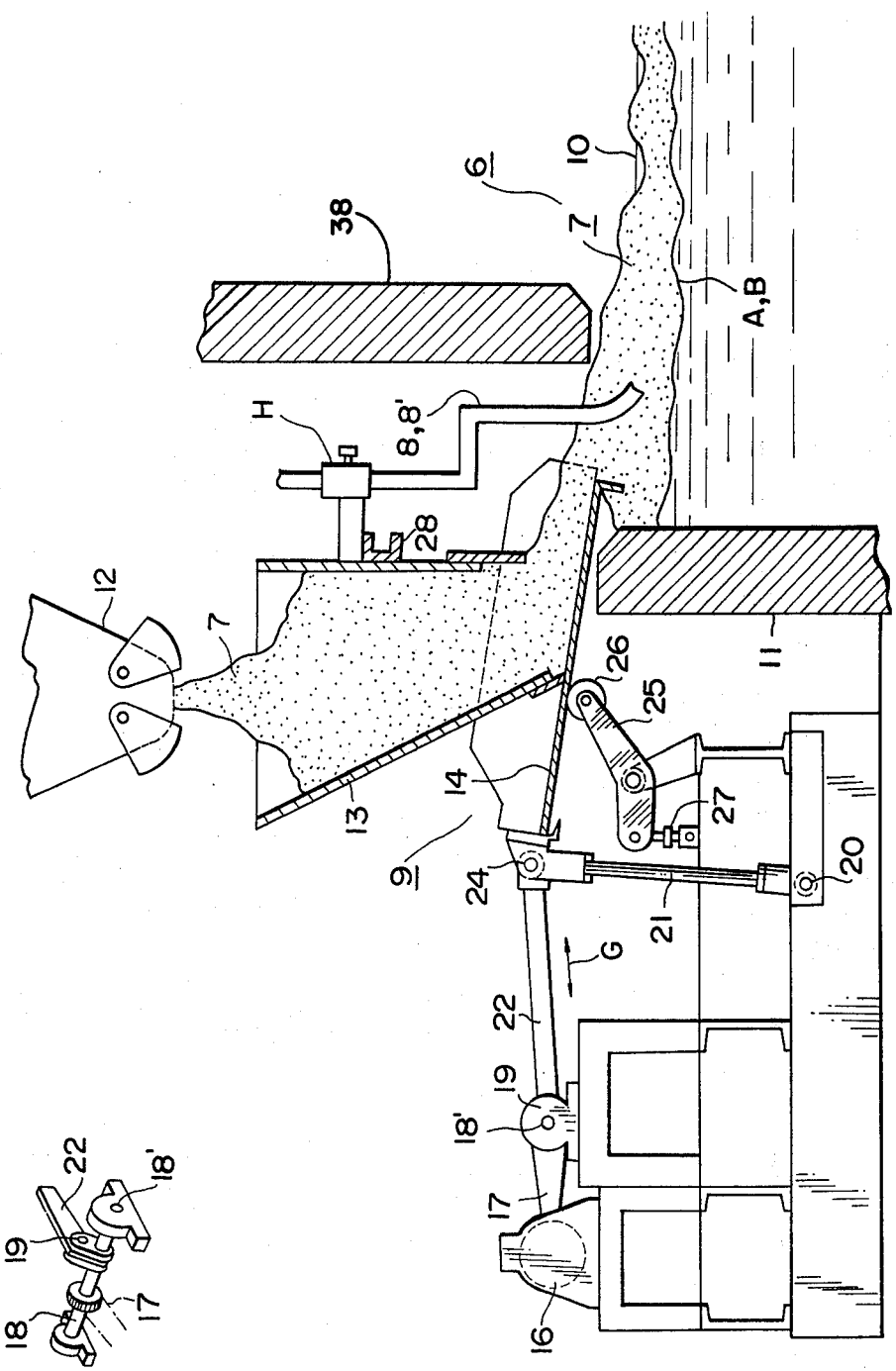
FIG. 3 is a side view of a material feeding device equipped with an obstruction device, which is used in the first embodiment of the present invention.
FIG. 4 is a perspective view of a motion converting device by which rotation motion is converted to reciprocating motion.

The raw materials 7 are thrown into the tank 6 and heaped up on the surface of the molten glass in a manner as shown in the right section of FIG. 3. However, as has been mentioned hereinbefore, the raw materials 7 tend to be divided into two sections as they move in the downstream direction due to the fact that the raw materials heaped at the laterally central portion of the tank are melted first.

According to the present invention, obstruction devices or members 8 and 8′ are employed for applying to the heap of the raw materials on the molten glass flow resistance. The obstruction members 8 and 8′ are located in the vicinity of a back wall 11 of the dog house section 15 and near the longitudinal axis of the tank 6. As will be understood from FIG. 3, each of the obstruction members 8 and 8′ may be in the form of a rod of which a downwardly leading end is embedded in the mass 35 of the raw materials 7 which ride on the molten glass in the tank 6.

FIG. 3 is a view taken along the line C—C of FIG. 2 with the addition of a part of a blanket feeder. As is shown in the drawing, a variable speed motor 16 having a speed reducer is mounted on a stand (no numeral) which is located outside of the tank 6. From this motor 16, an endless chain 17 extends to a motion converting device which converts the rotational motion of the motor 16 to a reciprocating motion. As is shown in FIG. 4, the motion converting device comprises two aligned shafts 18 and 18′ which are respectively and rotatably supported on bearing stands (no numerals). The chain 17 engages with a pulley (no numeral) mounted on the shaft 18 for transmitting the rotational motion of the motor 16 to the shaft 18. A pair of arms (no numerals) connected at their one ends by a pin 19 are fixed at their other ends to the shafts 18 and 18′ to be rotatable with the shafts 18 and 18′ about the axis of the shaft 18. A bar 22 is rotatably held at its one end by the pin 19 so that the rotation of the arm about the axis of the shaft 18 induces reciprocating movements of the bar 22. The other end of the bar 22 is journaled on a shaft 24 which is arranged on the free side of a tray 14. Designated by numeral 21 is a rod which has an upper end journaled on the shaft 24 and a lower end pivotally supported on a stationary shaft 20. The tray 14 is slidably supported on a free wheel 26 journaled on an end of a dog-leg-shaped arm 25. The arm 25 is swingably supported at its middle section by a supporter (no numeral). The height adjustment of the free wheel 26 is simply made by handling or rotating a nut 27 associated with the other end of the arm 25. With this construction, it will be appreciated that the rotational motion of the shaft 18 induced by the motor 16 will induce reciprocating movements of the arm 22 in a manner as is indicated by double arrow G thereby inducing reciprocating movements of the tray 14.

Denoted by numeral 12 is a batch banker from which the raw materials 7 of the glass fall into a blanket hopper 13. The materials in the hopper 13 are drawn from the outlet of the hopper 13 and heaped up on the tray 14. By the reciprocating movements of the tray 14, the materials 7 on the tray 14 automatically fall on a surface of the raw materials which are previously heaped on the molten glass in the tank 6. It should be noted that the rightward movement of the tray 14, that is the movement toward the tank 6, will provide the raw materials 7 on the molten glass with a propulsion force which urges the materials to move in the downstream direction.

As is understood from FIG. 3, the obstruction members 8 and 8' are laterally movably arranged on a bar 29 mounted on the body of the blanket hopper 13. Further, the obstruction members 8 and 8' are vertically movable by means of height adjusters H.

Figures 5, 6, 7:
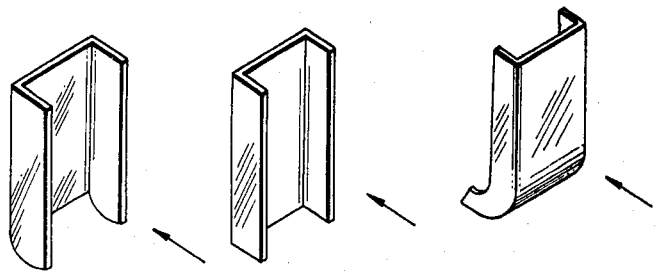
FIGS. 5, 6 and 7 are perspective views of obstruction devices usable in the invention.

The configuration of the free ends of the obstruction members 8 and 8' are so formed to produce a considerable resistance against the propulsion force of the raw materials 7 on the molten glass. FIGS. 5, 6, and 7 show some examples of such configuration. Each arrow shown in these drawings shows the direction of the propulsion force possessed by the raw materials on the molten glass in the tank 6. In addition to such configurations, other configurations such as a tubular configuration are also usable in the invention.

The obstruction members 8 and 8' have associated therewith an obstruction or wall member 38 which is positioned adjacent to, but downstream of, the members 8 and 8', FIG. 3. The wall member 38 extends downwardly toward the surface of the molten glass and tends to define the dog house section 15 between said wall member and the back wall 11. This arrangement or concept is important when considering that the temperature in the dog house area is not so high, as compared with the temperature in the laterally middle portion of the glass melting tank, whereby the raw materials are not so highly melted in the dog house area. The wall member 38 tends to define a dog house section for the obstruction members 8 in acting as a flow resistor with respect to the smooth flow of the raw materials on the molten glass.

The following description is directed to a consideration of the operation of the obstruction membes 8 and 8'.

Figure 8:
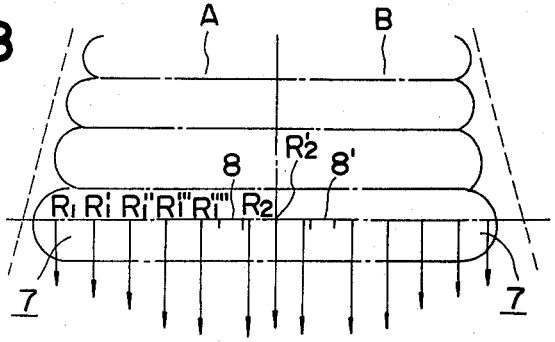
FIGS. 8, 9 and 10 are views explaining the manner of movement of the raw materials floating on the molten glass, achieved by the first embodiment of the invention.
Figure 9:
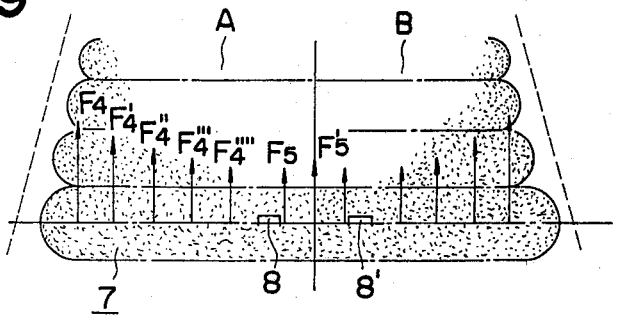
Figure 10:
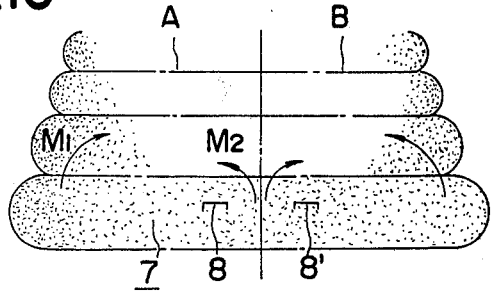

As is understood from the afore-mentioned explanation, the obstruction members 8 and 8' act as flow resistors which obstruct smooth flow of the raw materials on the molten glass. As is seen from FIG. 8, the resistance ($R_1$, $R'_1$, $R''_1$, $R'''_1$, $R''''_1$, $R_2$ and $R'_2$) applied by the obstruction members 8 and 8' to the raw materials 7 is increased as the distance from the obstruction members 8 and 8' decreases. Thus, the propulsion force of the raw materials 7 is decreased as the distance from the obstruction members 8 and 8' decreases. In fact, it has been revealed that the propulsion force of the materials 7 located at the laterally outer side of the mass A or B is substantially the same as the material pushing force produced by the reciprocating movement of the tray 14. As has been mentioned hereinafore, the cohesive masses 33, 33' and 33" or 34, 34' and 34"" (which form the heap A or B) are considered to move as a united mass, and the raw materials 7 located at the laterally central portion of the tank 6 melt faster than those at the other portion of the same. The two heaps A and B are kept separated from each other by a given distance and the obstruction members 8 and 8' are not immersed in the molten glass. Accordingly, it never occurs that each of the heaps A and B of the raw materials 7 is divided by the obstruction members 8 and 8' under movement or flowing thereof in the downstream direction. Thus, it is considered that during movement of the raw materials 7 in the downstream direction, turning effects provided by the moments $M_1$ and $M_2$ shown in FIG. 10 produce about the obstruction members 8 and 8' due to the propulsion difference appearing along the lateral dimension of the mass of the materials on the molten glass. Now, it should be noted that since the obstruction members 8 and 8' are located nearer to the central portion of the tank, the magnitude of $M_1$ is greater than that of $M_2$ so that a moment $M_A$ (or $M_B$)(which is equivalent with $M_1-M_2$) appears in the heap A (or B) urging the heap A (or B) to rotate in the clockwise (or counterclockwise) direction in FIG. 2. It has been revealed that the magnitude of the moment $M_A$ or $M_B$ is greater than the magnitude of the before-mentioned $F_3$ or $F'_3$. Thus, the movement of the raw materials in the downstream direction in the tank is accomplished without movement of the same toward the side walls 4. This means that the heap of the raw materials never touches the side walls 4 while flowing in the downstream direction.

Although in the foregoing, description is made with respect to the two obstruction members 8 and 8', it is sufficient to use only one obstruction member. In this case, the obstruction member is arranged at the laterally central portion of the way along which the heap of the raw materials moves in the downstream direction.

Figure 11:
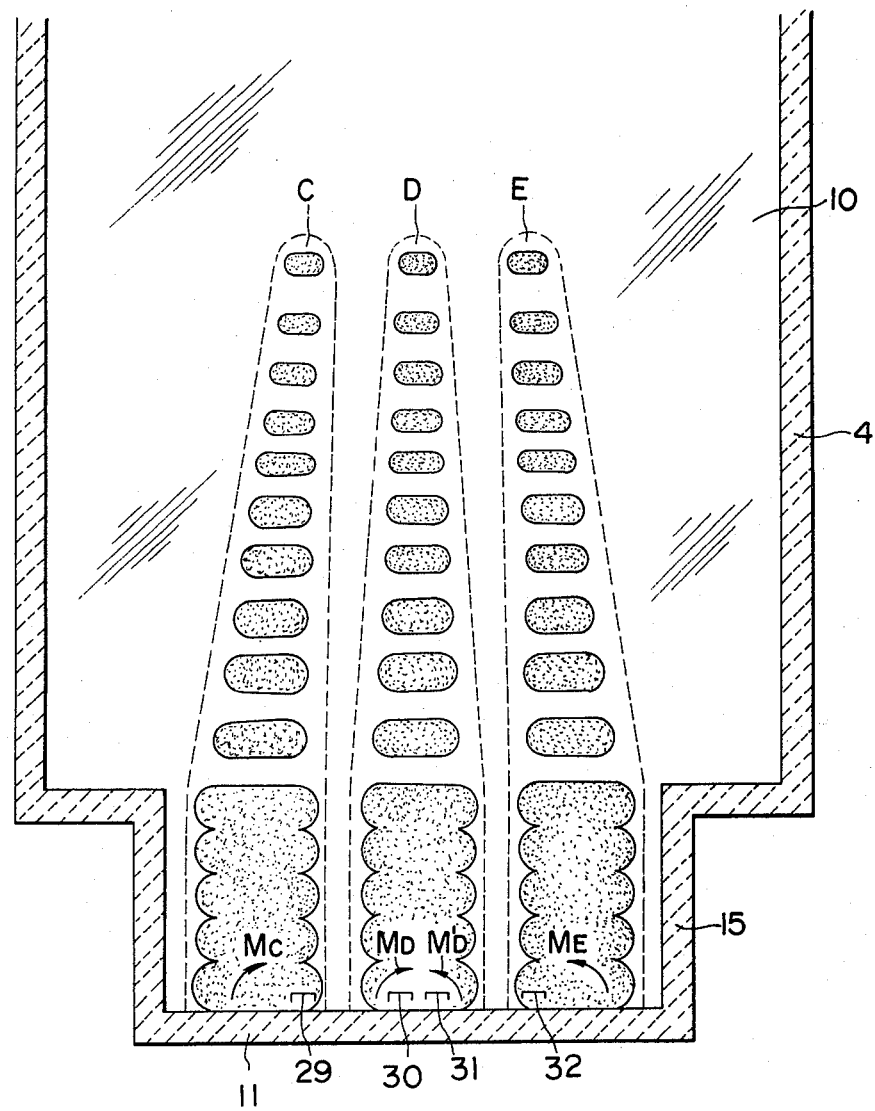
FIG. 11 is a view similar to FIG. 2, but shows the manner of flow of the raw materials which is achieved by a second embodiment of the invention.

FIG. 11 shows a glass melting tank which is equipped with a glass material feeding apparatus of an alternative embodiment of the invention. In this embodiment, three blanket feeders (not shown) are employed. The raw materials in the blanket feeders are independently thrown through respective outlet openings of the feeders into the dog house section 15. Thus, three heaps C, D and E of cohesive masses of raw materials appear on the surface of the molten glass in the tank, as shown. As shown in this drawing, an obstruction member 29 is located within the path of the heap C but nearer to the right side of the zone than the left side, obstruction members 30 and 31 are located at the laterally middle section of the path of the heap D, and an obstruction member 32 is located within the path of the heap E but nearer to the left side of the zone than the right side. Similarly to the afore-mentioned first embodiment, the obstruction members 29, 30, 31 and 32 are constructed to be vertically and horizontally adjustable and the leading ends of the members are kept embedded in the raw materials on the molten glass. Upon flowing of the raw materials in the downstream direction in the tank, the heap C or E of the materials is subjected to a moment $M_C$ or $M_E$ at a section near the corresponding obstruction member 29 or 32 for the same reasons as has been mentioned hereinafore, so that the heaps C and E are urged to approach each other during their downstream flow. By the provision of obstruction members 30 and 31, the heap D is subjected to two moments $M_D$ and $M_D'$ which are reversed in direction, so that the raw materials of the heap D are forced to move along the laterally center section of the tank without spreading in the lateral directions.

It should be noted that the obstruction members 30 and 31 may be omitted so long as the heap D moves along the laterally center section of the tank and the raw materials of this heap are homogeneously heated in their entirety. However, in practice, this is very difficult. Thus, such obstruction members 30 and 31 are employed. In fact, when the temperature distribution in the tank is not uniformly made, it sometimes happens that the raw materials of the heap D swerve from the middle course thereby approaching one of the side walls of the tank.

With the above, it will be appreciated that the moments $M_C$, $M_D$, $M_D'$ and $M_E$ act to prevent the flow of the raw materials which ride on the molten glass in the downstream direction from spreading laterally. Thus, the raw materials on the molten glass move substantially straight along the longitudinal axis of the tank while melting gradually.

Although in the foregoing, the description is directed to an apparatus using the blanket feeder, other type feeders may be employed so long as they are of a type which provides the raw materials thrown onto the molten glass with a propulsion force.

With the above, it will be appreciated that according to the present invention, the undesired corrosion of the tank which is caused by the contact of the corrosive raw materials of the glass on the molten glass with the side walls of the tank is assuredly prevented thereby extending the life-time of the tank. Furthermore, it has been revealed that according to the present invention, the undesired wrinkles or creases and bubbles are not found in the glass product.

What is claimed is:

1. An apparatus for producing sheet glass, comprising:

an oblong glass melting tank for molten glass;

said tank having heating means arranged such that said tank has its zone of highest temperature along the longitudinal axis of said tank;

said tank having an extension provided at its axial one end terminating in a backwall;

material feeding means located at said backwall for feeding raw materials of glass onto a surface of molten glass in said extension of said tank so that the heap of raw materials riding on the surface of molten glass is forced to move in a downstream direction away from said backwall;

a wall member located in the area of said extension and spaced from said backwall and defining with said backwall a dog house section;

an obstruction member means associated with said material feeding means at said dog house section and projecting into said heap of raw materials entirely within said dog house section for imparting flow resistance to said heap of raw materials where the temperature is less than the temperature in the glass melting tank, the projecting end or ends of said obstruction member means being embedded in the heap of the raw material only at a position close to the laterally central portion of said tank.

2. An apparatus as set forth in claim 1, wherein said material feeding means includes a material receiving hopper communicating with a reciprocatory tray.

3. An apparatus as set forth in claim 2, wherein said tray is actuated by a reciprocating arm while positioned on a roller journaled on an arm member.

4. An apparatus as set forth in claim 1, wherein said obstruction member means comprises at least one elongated member having an end portion embedded in the heap of raw material on said surface of molten glass in the vicinity of said backwall.

5. An apparatus as set forth in claim 4, wherein said obstruction member means is mounted on a material receiving hopper for adjustment in both a vertical and horizontal plane to maintain an end thereof within the heap of raw material on the surface of said molten glass.

6. An apparatus as set forth in claim 5, wherein said wall member means is positioned downstream of said at least one obstruction member.

* * * * *